(No Model.) 6 Sheets—Sheet 4.

C. LIPPS.
SOAP CAKING MACHINE.

No. 600,434. Patented Mar. 8, 1898.

Witnesses

Inventor
Cristopher Lipps
By James L. Norris
his Atty.

(No Model.) 6 Sheets—Sheet 6.

C. LIPPS.
SOAP CAKING MACHINE.

No. 600,434. Patented Mar. 8, 1898.

Witnesses
Inventor
Christopher Lipps
By James L. Norris.
Atty.

UNITED STATES PATENT OFFICE.

CHRISTOPHER LIPPS, OF BALTIMORE, MARYLAND.

SOAP-CAKING MACHINE.

SPECIFICATION forming part of Letters Patent No. 600,434, dated March 8, 1898.

Application filed November 23, 1896. Serial No. 613,210. (No model.)

*To all whom it may concern:*

Be it known that I, CHRISTOPHER LIPPS, a citizen of the United States, residing at Baltimore city, State of Maryland, have invented new and useful Improvements in Soap-Caking Machines, of which the following is a specification.

This invention relates to machines for subdividing solid blocks of soap of greater or less dimensions into a large number of cakes of square or rectangular form or shape through the medium of horizontally and vertically movable frames, each having cutting or severing wires stretched across it in such manner that by holding the block of soap stationary and imparting motion to the horizontally-movable frame the wires thereof divide the soap block into a plurality of superimposed slabs, after which motion is imparted to the vertically-movable frame, so that the wires thereof subdivide these slabs into a large number of square or rectangular cakes.

The chief objects of my present invention are to improve the construction and operation of soap-caking machines of the general character referred to, to provide new and improved means for operating the wire carrying or cutting frames which divide the block of soap first into slabs and subsequently into cakes ready for the market, to provide new and improved means whereby the slabber and caker frames are automatically operated when a starting or stopping lever is actuated by the attendant, and to provide new and improved means whereby the slabber-frame is caused to advance horizontally for cutting or severing the soap block into slabs and is then automatically stopped while the caker-frame descends.

To accomplish all these objects, my invention involves the features of construction, the combination or arrangement of parts, and the principles of operation hereinafter described and claimed, reference being made to the accompanying drawings, in which—

Fig. 12 is a detail perspective view of a portion of the caker-frame.
Fig. 13 is a transverse sectional view of the same.
Fig. 14 is a detail perspective view of a portion of a gage-bar used to set the cutting or severing wires of the caker or slabber frame in the position necessary to secure the desired size of cakes.
Fig. 15 is a detail sectional view showing a modification of a part of the mechanism by which the cutting or severing wires of the caker or slabber frame are placed under tension.
Fig. 16 is a detail perspective view of the cross-bar designed to be detachably applied to one end of the soap-car and to serve as an abutment for the lower edge of the slabber-frame, so that the latter can be utilized to move the loaded car into position for the cutting or severing operations.
Fig. 17 is a detail sectional view showing the manner in which the cross-bar,
Fig. 16, is detachably engaged with one end of the soap-car.
Figs. 18, 19, and 20 are detail views showing a modification of the cutting or severing devices to be used in connection with the caker or slabber frames.

In order to enable those skilled in the art to make and use my invention, I will now describe the same in detail, referring to the drawings, wherein—

Figures 2, 3:
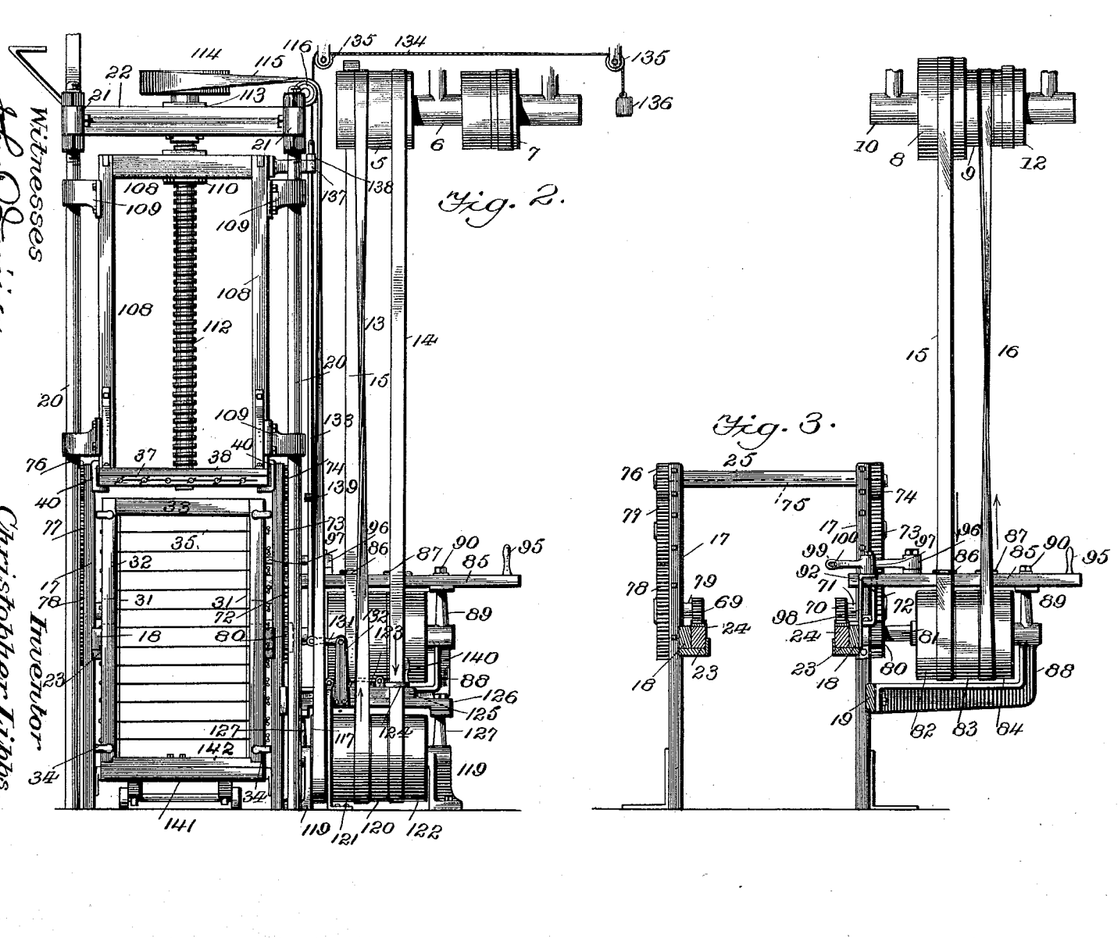
Fig. 2 is an elevation looking at what may be termed the "rear" end of the machine.
Fig. 3 is a vertical sectional view taken on the line 3 3, Fig. 1, and looking toward the front end of the machine.

The numeral 5, Fig. 2, indicates a belt-pulley secured to a shaft suspended from a ceiling or other support by a hanger 6 and rotated by a power-driven pulley 7.

The numerals 8 and 9 indicate belt-pulleys secured to a shaft suspended by a hanger 10 and rotated by a power-driven pulley 12 substantially the same as the pulley 7.

The soap-caking machine is arranged in suitable relation to the aforesaid power-driven pulleys, so that the latter serve to drive the belts 13, 14, 15, and 16, Figs. 2 and 3, which transmit motion to the working parts of the machine, as will be hereinafter explained in detail.

The stationary frame of the machine may be constructed in any manner suitable for the purpose in hand, but, generally speaking, it is preferably composed of standards 17, side sills 18, connecting-brace 19, and four perpendicular cylindrical rods 20, connected at their upper ends by longitudinal beams 21 and transverse tie-beams 22. The side sills 18 are so constructed at their inner sides that they constitute rails or tracks 23 for the longitudinal-traversing motion of comparatively long rack-bars 24, arranged parallel with each other and adapted to be moved back and forth by power-driven mechanism, as will hereinafter appear. The upper ends of the standards 17 may be connected and braced by transverse beams 25 to secure a rigid and substantial structure. The longitudinal beams 21 are designed to be connected by suitable braces with the ceiling of the room in which the machine is located.

Figure 8:
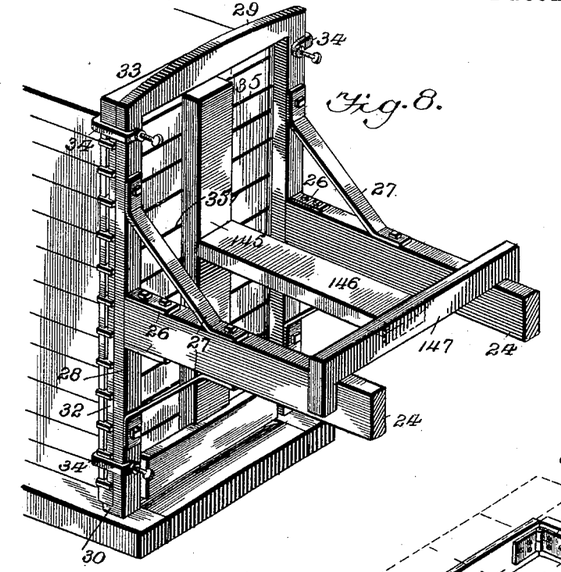
Fig. 8 is a detail perspective view of a portion of a soap block divided into slabs and showing the slabber-frame in the position it occupies after having been moved to force its wires through the soap block.
Figure 9:
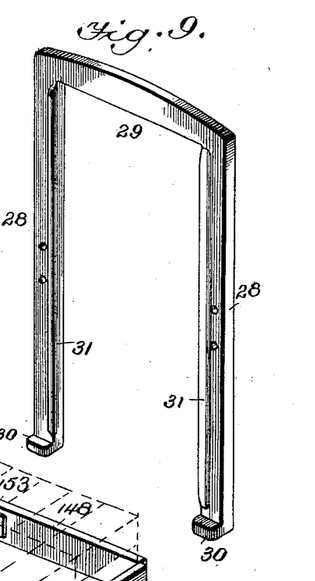
Fig. 9 is a detail perspective view of the yoke-frame to which the slabber-frame is secured.

The rear or inner ends of the rack-bars 24 are connected by clips 26 and braces 27 with the side arms or members 28 of a yoke-shaped frame. (Best seen in Fig. 9.) The upper ends of the side arms or members 28 are rigidly connected by a cross arm or portion 29, and the lower ends of the arms or members 28 are each constructed with a projecting foot-piece 30. The inner edge portions of the arms or members 28 are formed integral with longitudinal-projecting ribs 31, Fig. 9, which serve as abutments for the perpendicular side bars 32 of a slabber-frame 33, designed to be detachably connected with the yoke-shaped frame 28 and 29 through the medium of clamps 34, as best seen in Fig. 8. The clamps may be of any desired construction, but are preferably U-shaped metal bars, having at one end clamping-screws, whereby the slabber-frame may be rigidly clamped to the yoke-shaped frame of the rack-bars. The lower ends of the side bars 32 of the slabber-frame rest upon the projecting feet 30 and the inner edges of the side bars bear against the ribs 31 of the side arms.

Figure 1:
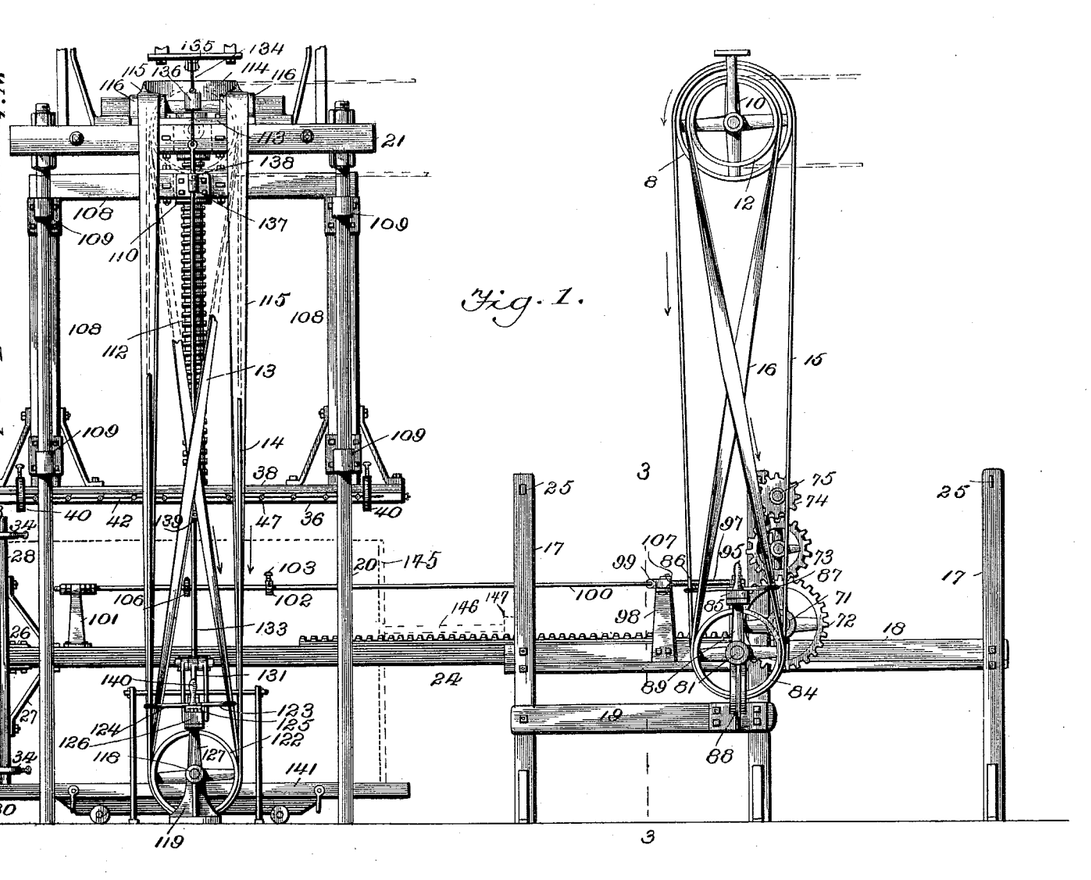
Figure 1 is a side elevation of a soap-caking machine embodying my invention and looking at the side which for convenience of explanation I will term the "left-hand" side of the machine.
Figures 12, 13, 14, 15, 16, 17, 18, 19, 20:
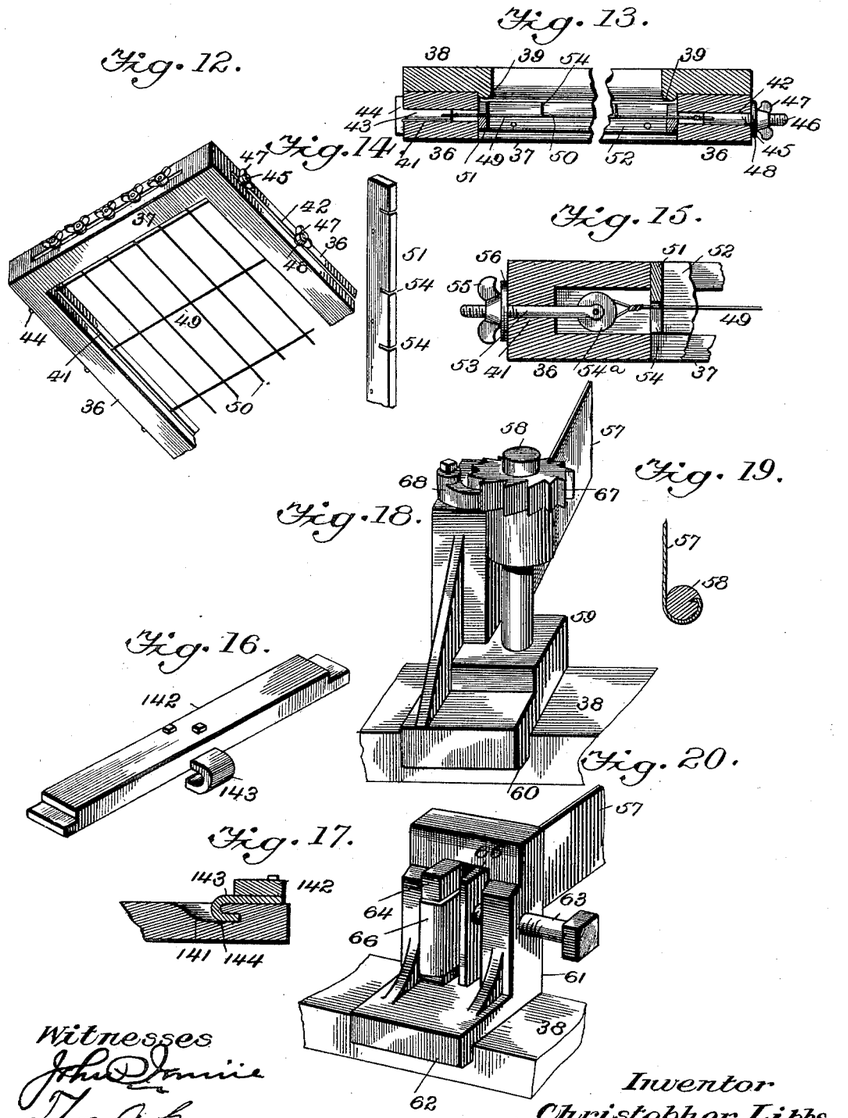

The side bars 32 of the slabber-frame are connected by a plurality of horizontal cutting or severing wires 35, which are arranged, adjusted, and placed under tension through the medium of devices the same as those hereinafter described with reference to the caker-frame, and this being the case I will now describe the caker-frame, so that the construction of the wires of both the slabber and caker frames will be clearly understood. A portion of the caker-frame is represented in Fig. 12, and by reference to this figure it will be seen that the frame comprises side bars 36 and end bars, as at 37. The caker-frame is designed to be secured to a carrier composed of an open rectangular metal frame 38, Figs. 1 and 13, having a projecting bead or rib 39 around the edge of the opening in the frame in such manner that the side and end bars 36 and 37 of the caker-frame can abut against these beads or ribs, as clearly shown in Fig. 13.

The caker-frame 36 is detachably connected to the carrier or frame 38 through the medium of clamps 40, constructed and applied in a manner the same as the clamps 34. The side bars 36 are constructed with longitudinal slots 41 and 42, Figs. 12 and 13, which extend from the outer edge of the bars 36 to the inner edges thereof in a plane parallel with the rear surfaces of the bars. The slots 41 contain a plurality of stems 43, having heads 44, bearing against the outer edge of the side bar containing the slot 41. The slot 42 contains a plurality of stems 45, having screw-threads at their outer ends, as at 46, to receive thumb-nuts 47, between which and the outer edge of the bar containing the slot 42 suitable washers 48 are arranged, as best seen in Fig. 13. The transverse cutting or severing wires 49 of the caker-frame are connected at one end with the stems 43 and at the other end with the stems 45, and after the stems have been adjusted to the required position the thumb-nuts 47 are tightened up for the purpose of placing the wires 49 under tension, which can be increased or diminished to suit the conditions required by turning the thumb-nuts 47 in the proper direction. The longitudinal slots 41 and 42 render it possible to shift the stems 43 and 45 along the side bars 36, so that the wires 49 can be properly adjusted the required distances apart. The end bars 37 of the caker-frame are also provided with stems substantially the same as the stems 43 and 45, so that the longitudinal wires 50 of the caker-frame can be adjusted or set the required distances apart and then be placed under tension.

To conveniently and quickly adjust or set the cutting or severing wires 49 and 50 the necessary distances apart to secure the required size of soap cakes, I provide gage-bars 51 and 52, Figs. 13 and 14, which are each constructed at the proper distances apart with notches or recesses 54, with which the wires are engaged, so that they may all be spaced apart to suit the conditions required. The gage-bars 51 are adapted to be arranged along the inner edges of the side bars 36 and the gaged bars 52 are designed to be arranged along the inner edges of the end bars 37, whereby the longitudinal and transverse wires 49 and 50 can be accurately, conveniently, and rapidly adjusted or set to the required positions necessary to secure uniform soap cakes. The side bars 32 of the slabber-frame 33 are also provided with longitudinal slots and with stems the same as the stems 43 and 45, so that the transverse cutting or severing wires 35 may be adjusted or set the necessary distances apart to secure soap slabs of the desired thickness.

The beads or ribs 39 of the open rectangular frame 38 serve as abutments to prevent displacement of the caker-frame. The beads or ribs 31 effectually prevent displacement or lateral sliding of the slabber-frame and may serve to prevent the side bars 32 springing toward one another if the wires are tightened to place them under considerable tension while the slabber-frame is upon the yoke-frame 28 29.

Instead of constructing the stems 43 and 45 as shown in Fig. 13 I may construct these stems as shown in Fig. 15, where the numeral 53 indicates a stem having at its inner end a disk 54ª, around the periphery of which a loop on one end of the cutting or severing wire is placed. The outer end of the stem 53 is screw-threaded to receive a thumb-nut 55, between which and the caker-frame a washer 56 is arranged. By providing each wire with a tightening device, such as shown in Fig. 15, all the wires can be properly adjusted and placed under tension. The wire-tension device shown in Fig. 15 can also be used in connection with the wires of the slabber-frame, as will be obvious.

Instead of constructing the cutting or severing devices of the caker and slabber frames in the form of wires, as above described, I may make them in the form of comparatively thin flat metal plates 57, having one end extending partially around a rotary shaft 58, Figs. 18 and 19, and the other end secured in a clamp, as shown in Fig. 20. The shaft 58 is mounted in a bracket or casting 59, having a pendent flange 60, designed to bear against the outer edge of the frame 38 or the outer edge of one of the side arms 28. The clamp, Fig. 20, forms part of a bracket or casting 61, having a pendent flange 62, adapted to bear against the outer edge of the frame 38 or the outer edge of the arm 28 opposite the side against which the flange 60 bears. The clamp comprises a set-screw 63 and two plates 64 and 65, between which one end of the metal plate 57 is arranged and around one of which plates, as at 64, the bent end of the plate 57 is extended, as at 66. By tightening the set-screw 63 the plates 64 and 65 may be rigidly clamped together and the bent end 66 of the plate 57 will be firmly held, so that the plate 57 can be subsequently placed under tension by turning the shaft 58. The shaft 58 is provided with a ratchet-wheel 67, with which a pawl 68 engages, so that the ratchet-wheel is locked against back motion, but can be turned in the direction necessary to tighten the plate 57 and place it under tension. The shaft 58 or the ratchet-wheel 67 may be turned through the medium of any suitable device—such, for example, as a wrench.

The brackets or castings 59 and 61 are susceptible of being shifted along the frame 38 or along the side arms of the yoke-frame 28 29, so that the cutting-plates 57 may be adjusted toward or from one another to vary their distances apart in a manner similar to the adjustment of the cutting or severing wires before explained.

The slabber-frame is designed to be moved rearward and then to be moved forward to divide the block of soap into slabs of substantially equal thickness, after which the caker-frame is moved downward to subdivide the soap slabs into cakes and is then raised to its normal position, all as will more fully hereinafter appear.

Figures 5, 6, 7:
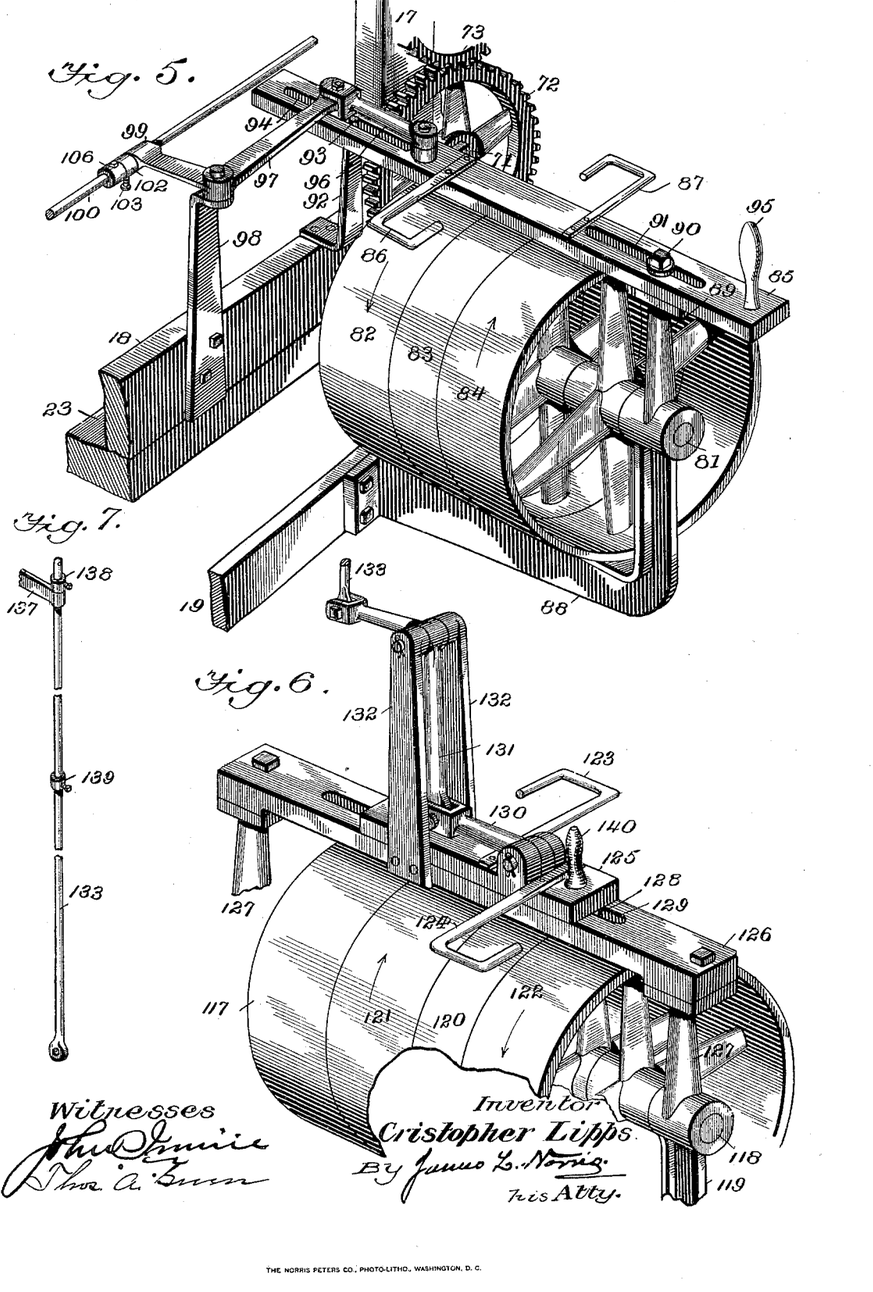
Fig. 5 is a detail perspective view showing the belt-pulleys, the belt-shifter, and a portion of the gearing by which the slabber-frame is moved back and forth in a horizontal plane.
Fig. 6 is a detail perspective view showing the belt-pulleys and the belt-shifter by which the belts which impart motion to the caker-frame are operated to raise and lower said frame.
Fig. 7 is a detail view of the vertical rod by which the shifter shown in Fig. 6 is automatically operated by the caker-frame, as will hereinafter appear.

The slabber-frame is moved horizontally in either direction through the medium of pinions 69 and 70, (best seen in Fig. 3,) which engage the rack-bars 24 and are susceptible of being rotated in either direction. The pinion 70 is secured to one end of the short shaft 71, having at its other end a spur-gear 72, meshing into a gear 73, which in turn engages and drives a pinion 74 on one end of a transverse shaft 75, having its other end provided with a pinion 76, engaging a gear 77, which meshes into a spur-gear 78, mounted on one end of a short shaft 79, which carries the pinion 69. The spur-gear 72 is driven by a pinion 80, mounted on a short horizontal shaft 81, provided with three belt-pulleys 82, 83, and 84, (best seen in Figs. 3 and 5,) the pulleys 82 and 84 being dead or loose pulleys on the shaft 81, while the pulley 83 is a live-pulley secured to the said shaft. The belts 15 and 16, as shown in Fig. 3, are engaged with the dead-pulleys 82 and 84; but either belt is adapted to be shifted onto the live-pulley 83, and since the belt 15 is a straight belt and the belt 16 is a crossed belt it is possible to cause the live-pulley 83 to rotate in either direction, according to which belt is shifted thereupon, while if the belts 15 and 16 are shifted, respectively, onto the pulleys 82 and 84 the shaft 81 will remain stationary. By this means the pinions 69 and 70 can be rotated in either direction to reciprocate the rack-bars 24 or can be stopped at any time for the purpose of stopping the horizontal motion of the slabber-frame, which is connected with the rack-bars, as before explained. The drive-belts 15 and 16 are susceptible of being shifted through the medium of a shfter-bar 85, having shifter-loops 86 and 87, through which the belts 15 and 16 respectively pass. The shaft 81 of the pulleys 82, 83, and 84 is mounted in suitable bearings on a lateral bracket-arm 88 (best seen in Figs. 3 and 5) and having at its outer end an upwardly-projecting post or stud 89, which at its upper ends constitutes a rest or support for the outer end of the shifter-bar 85 and to which the latter is loosely connected by a set-bolt 90, extending through a longitudinal slot 91 in the outer end portion of the shifter-bar. The inner end portion of the shifter-bar rests upon the upper end portion of a post 92, the extremity of which, as at 93, enters a longitudinal slot 94 in the inner end portion of the shifter-bar. By the means described the shifter-bar is properly supported and can be moved lengthwise in either direction to shift the belts 15 and 16, as will be obvious.

The outer end of the shifter-bar is provided with a suitable handle 95, by which the attendant can manipulate the same whenever necessary. This shifter-bar is also connected by a link 96 with the long arm of a bell-crank lever 97, pivotally mounted on a post or support 98 and having a short arm provided with an eye 99, through which a rod 100 is adapted to slide and to operate the bell-crank lever 97 for automatically actuating the shifter-bar 85, as will hereinafter appear. The rear end of the rod 100 is rigidly attached to an arm or post 101, Fig. 1, rising from one of the rack-bars 24 in proximity to the slabber-frame 33. The rod 100 is provided with a tappet 102, (best seen in Figs. 1, 4, and 11,) and preferably in the form of a collar or ring having a pin 103, Fig. 11, adapted to be moved into and out of engagement with the rod 100, whereby the tappet 102 can be locked to or unlocked from the rod 100. The pin 103 is held in its locked or unlocked position by a spring-finger 104, secured to the tappet and having its free extremity adapted to engage either of two grooves 105, formed in the pin, as will be obvious. This tappet 102 is located upon the rod 100 between the eye 99 of the bell-crank lever 97 and the arm or post 101, secured to one of the rack-bars 24. The rod 100 is also provided with two other tappets 106 and 107, both of which may be rigidly secured to the rod in any suitable manner, but are preferably secured by set-bolts. The tappet 106 is located on the rod 100 between the arm or post 101 and the tappet 102, and the tappet 107 is arranged on the front end portion of the rod 100 at the proper point to operate, as will hereinafter appear.

The side bars 38 of the caker-frame are secured to the lower end of a vertically-movable frame 108 of any suitable construction, having guide-eyes 109, which engage and slide upon the cylindrical rods 20. The upper end of the frame 108 is provided centrally with a suitable non-rotary screw-nut 110, engaging a central screw-shaft 112, having its upper end portion arranged to rotate axially in a suitable bearing 113, so that by rotating the screw-shaft in one or the other direction the nut 110 is caused to traverse the shaft, and the frame 108, carrying the caker-frame, will be raised or lowered. The upper extremity of the screw-shaft 112 is provided with a belt-pulley 114, driven by a belt 115, which extends horizontally from the pulley over small pulleys 116, rotating in a plane at right angles to the plane of rotation of the pulley 114. The belt 115 extends downward in a right line from the pulleys 116 and passes around a live-pulley 117, (best seen in Fig. 6,) which is secured to a short horizontal shaft 118, mounted in suitable supports or pillow-blocks 119. The shaft 118 is also provided with a live-pulley 120 and with dead-pulleys 121 and 122, arranged, respectively, at opposite sides of the live-pulley 120. The crossed belt 13 and straight belt 14, driven by the pulley 5, (best seen in Fig. 2,) normally engage, respectively, the dead or loose pulleys 121 and 122, but each of these belts is susceptible of being shifted onto the live-pulley 120, as I will now explain.

The crossed and straight belts 13 and 14 respectively pass through shifter-loops 123 and 124, projecting in opposite directions from a belt-shifter bar 125, (best seen in Fig. 6,) which is mounted upon a flat bar or support 126, secured to posts or studs 127, rising from the supports or pillow-blocks 119. The shifter-bar 125 is movable longitudinally on the bar or support 126 and is suitably guided in its movements, preferably by a projection 128 on the shifter-bar entering a longitudinal slot 129 in the bar or support 126. The shifter-bar 125 is connected by a link 130 with the long arm of a bell-crank lever 131, pivoted at its angle to standards or supports 132, rising from the fixed bar or support 126. The short arm of the bell-crank lever 131 is connected with the lower end of a perpendicular rod 133, adapted to be moved vertically and having its upper end connected with one end of a cable 134, which passes over guide-pulleys 135 and is provided at its other end with a counterbalance-weight 136. The object of this counterbalance-weight is to balance the perpendicular rod 133 and render it more easy of operation to effect the automatic shifting of the shifter-bar 125, as will hereinafter appear.

The vertically-movable frame 108 is provided at the upper end of one side with a laterally-projecting guide-eye 137, through which the rod 133 loosely passes, so that the guide-eye can slide on the rod. The upper end portion of the rod 133 is provided with a rigidly-attached tappet 138, preferably in the form of a collar or ring, and the rod is also provided at some distance from its lower end portion with a similar rigidly-attached tappet 139, the adjustment and arrangement of the parts being such that assuming the frame 108 to have been raised to its highest position and to then commence its descent the guide-eye 137 will strike the tappet 139 when the frame 108 reaches the limit of its downstroke, thereby moving the rod 133 downward and causing the bell-crank lever 131 to rock or swing in such direction that the shifter-bar 125 will be moved outward, thereby shifting the straight belt 14 from the live-pulley 120 onto the dead-pulley 122, whereupon the rotation of the shaft 118 will instantly cease and the motion of the belt 115 and screw-shaft 112 will be stopped. The frame 108 can then be caused to rise by the attendant pulling the shifter-bar 125 slightly outward through the medium of a handle 140, which shifts the crossed belt onto the live-pulley 120. This reverses the motion of the shaft 118, belt 115, and screw-shaft 112, so that the frame 108 is raised. When the frame reaches the limit of its up-stroke, the guide-eye 137 strikes the tappet 138 and raises the rod 133, thereby rocking or swinging the bell-crank lever 131 in the direction required to shift the crossed belt 13 from the live-pulley 120 onto the dead-pulley 121, whereupon the motion of the shaft 118 will cease and the belt 115 and screw-shaft 112 will be stopped.

Figure 4:
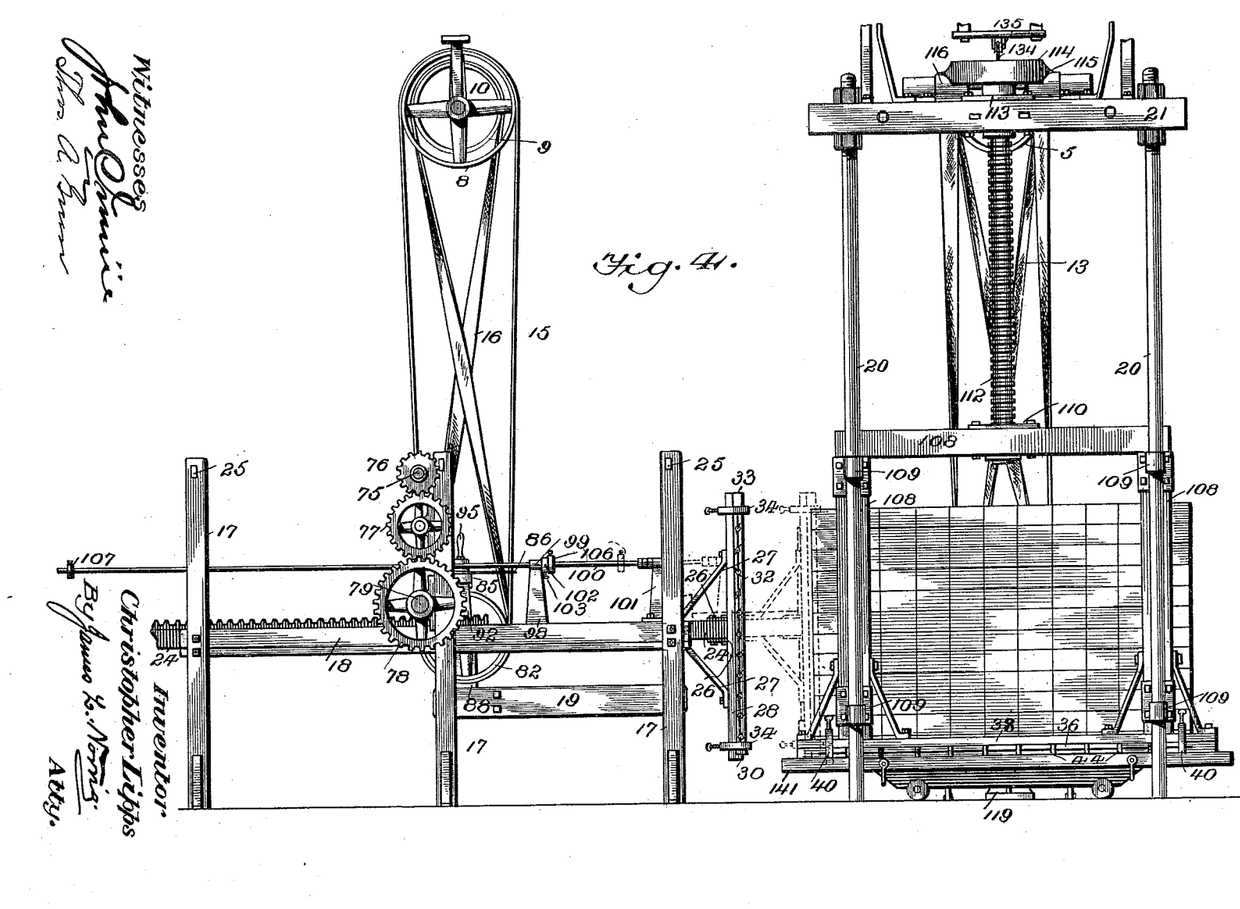
Fig. 4 is
a side elevation looking at what I will term the "right-hand" side of the machine or the side opposite to that represented in Fig. 1.

The soap block to be subdivided into cakes is mounted on a platform-car 141, as usual, and this loaded car is designed to be run under the beams 25 and between the opposite standards 17, so that while the slabber-frame is in the position represented by full lines in Fig. 4 the rear end of the car can be acted upon by the lower end of the slabber-frame for the purpose of pushing the car rearward into proper position under the caker-frame when the rack-bars are actuated to move the slabber-frame rearward. This is easily effected by a removable and replaceable cross-beam 142, Figs. 1, 2, 16, and 17, having a central hook 143, adapted to be hooked into a recess 144 in the end of the car, as clearly shown in Fig. 17, so that the beam will lie transversely of the car in the path of the lower end of the slabber-frame. The loaded car is run between the standards 17, while the slabber-frame 33 is stationary and the car is stopped when its rear end projects slightly in rear of the slabber-frame to enable the cross-beam 142 to be engaged with the car and serve as an abutment for the slabber-frame to push the car rearward under the caker-frame, where it will occupy the position indicated by dotted lines, Fig. 1, and full lines, Fig. 4.

When the car is connected with the slabber-frame and the caker-frame is motionless in its highest position, the attendant pulls the shifter-bar 85 outward through the medium of the handle 95, which shifts the straight belt 15 onto the live-pulley 83 and moves the crossed belt 16 outward on the dead-pulley 84. The shaft 81 is thereby rotated and the pinions 69 and 70 are turned in the direction necessary to force the rack-bars rearward until the loaded car is in such position that the soap block is directly under the caker-frame and the slabber-frame occupies the position shown in Fig. 1. When this occurs, the tappet 107 of the rod 100, which moves back and forth in harmony with the slabber-frame, will strike the guide-eye 99 of the bell-crank lever 97, rock or swing this lever, and move the shifter-bar 85 inward, thereby shifting the straight belt 15 from the live-pulley 83 onto the dead-pulley 82 and the crossed belt inward on the dead-pulley 84. The shaft 81 then ceases to rotate and the slabber-frame is stopped. The block of soap must now be held stationary, so that when the slabber-frame is moved forward to sever the soap into superimposed slabs the soap block cannot follow the motion of the slabber-frame. While this can be accomplished in any suitable manner, I employ for the purpose a blocking-frame comprising a vertical portion 145, a horizontal portion 146, and a transverse portion 147, these portions being preferably in the form of beams. The vertical beam 145 is designed to rest squarely against the front end of the soap block and the transverse beam 147 rests upon the upper edges of the rack-bars 24 and abuts against the standards 17 which are nearest the upright cylindrical rods 20, as will be understood by reference to Fig. 1, where the blocking-frame is indicated by dotted lines in the position it occupies when the slabber-frame is to be drawn forward to pass its cutting or severing wires through the block of soap, as above mentioned.

After the blocking-frame is placed in position as above stated the attendant pushes the shifter-bar 85 inwardly and thus shifts the crossed belt 16 onto the live-pulley 83 and moves the straight belt 15 inward on the dead-pulley 82, thereby reversing the motion of the shaft 81 and pinions 69 and 70, so that the slabber-frame is drawn forward and its cutting or severing wires pass horizontally through the block of soap and divide it into a large number of superimposed slabs.

When the slabber-frame reaches the position indicated by dotted lines, Fig. 4, its cutting or severing wires have cleared the soap block, the latter has been divided into superimposed slabs, and the tappet 102 will strike the guide-eye 99 of the bell-crank lever 97 and rock or swing it in the direction necessary to move the shifter-bar 85 outward and thus automatically shift the crossed belt 16 from the live-pulley 83 to the dead-pulley 84, whereby the motion of the shaft 81 ceases and the motion of the slabber-frame is stopped. The blocking-frame, composed of the vertical, horizontal, and transverse beams 145, 146, and 147, can now be removed from its position as a brace to the soap block, and then the pin 103 of the tappet 102 is drawn outward to unlock this tappet from the rod 100, so that the latter can slide therethrough when the shifter-bar 85 is operated by the attendant for the purpose of moving the slabber-frame from the position indicated by dotted lines, Fig. 4, to the position indicated by full lines in this figure. When the slabber-frame reaches about the position indicated by dotted lines, Fig. 4, the tappet 106, acting upon the tappet 102, which rests against the guide-eye 99 of the bell-crank lever 97, will cause this lever to move in the direction necessary to automatically shift the belts and stop the motion of the slabber-frame, when the parts will be in normal position ready for a repetition of the operation, as hereinbefore explained.

After the soap block has been divided into a plurality of slabs, as above stated, it is subdivided into a large number of rectangular or other suitably-shaped cakes through the medium of the caker-frame. To accomplish this, the attendant pushes the shifter-bar 125 inward, which shifts the straight belt 14 onto the live-pulley 120, thereby rotating the shaft 118 and imparting motion to the belt 115 for the purpose of rotating the screw-shaft 112 in the direction necessary to cause the nut 110 to move downward on the screw-shaft, whereby the frame 108 is lowered and the cutting and severing wires of the caker-frame are forced through the soap slabs until the caker-frame reaches or nearly reaches the car-platform 141, whereupon the guide-eye 137 of the frame 108 strikes the tappet 139, moves the rod 133 downward, and automatically moves the shifter-bar 125 outward to shift the belt 14 from the live-pulley 120 onto the dead-pulley 122. The frame 108 must now be raised to normal position, Figs. 1 and 2, and this is effected by the attendant pulling the shifter-bar 125 outward, which shifts the crossed belt 13 from the dead-pulley 121 onto the live-pulley 120, thus reversing the motion of the shaft 118, and consequently the direction of rotation of the screw-shaft 112. When the frame 108 reaches the limit of its upward stroke, the guide-eye 137 strikes the tappet 138, lifts the rod 133, and the shifter-bar 125 is automatically moved inward to shift the crossed belt 13 from the live-pulley 120 onto the dead-pulley 121, whereupon the rotation of the shaft 118 will cease and the rising motion of the frame 108 will be stopped.

Figures 10, 11:
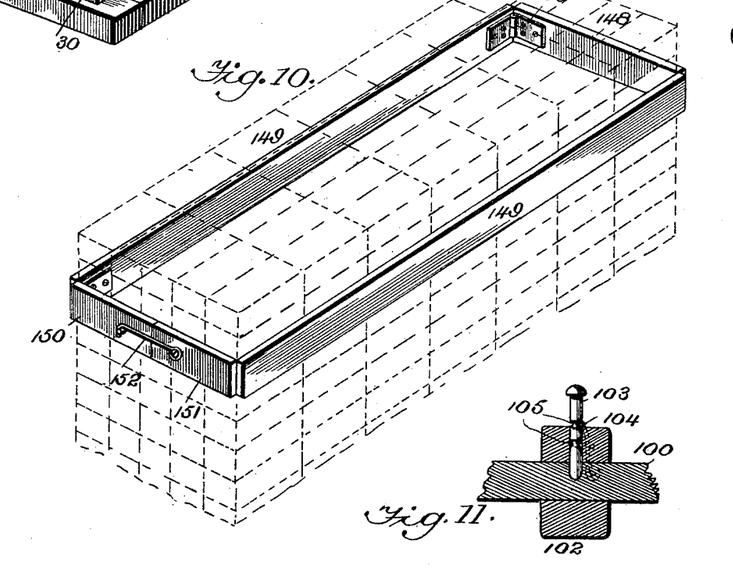
Fig. 10 is a detail perspective view indicating by dotted lines a soap block subdivided into rectangular cakes and showing my improved cake-retainer frame, which encircles the top portion of the block to maintain the uppermost layers of cakes in proper position as the caker-frame rises out of the subdivided soap block.
Fig. 11 is a detail sectional view showing the device by which an adjustable collar is locked to a rod which is moved by the slabber-frame to automatically operate the belt-shifter of the belt mechanism by which the slabber-frame is moved back and forth.

As the caker-frame, carried by the frame 108, moves upward the attendant places a rectangular frame, Fig. 10, around the subdivided soap block at a point directly under the caker-frame and causes the rectangular frame to follow the upward motion of the caker-frame, so that the uppermost layer or layers of soap cakes are maintained in proper position as the cutting or severing wires of the caker-frame leave the uppermost layers. This is a desirable and important feature in that it effectually prevents dislodgment of the uppermost soap cakes as the caker-frame rises out of the soap. The rectangular frame, Fig. 10, may of course be varied in shape to correspond with the shape of the soap block; but as these soap blocks are ordinarily rectangular I have illustrated the frame of a corresponding shape. The frame is composed of an end cross-board 148, two side boards 149, and an end board comprising two sections 150 and 151, adapted to be connected by a hook 152 or some other suitable locking or fastening device. The boards are hinged together by suitable hinges, as at 153, located at the corners of the frame in such manner that the latter can be opened or spread laterally to enable it to be placed around the mass of soap to encircle the same, after which the extremities of the boards 150 and 151 are brought together and locked through the medium of the hook or other locking device 152. The end and side boards composing the frame which retains the cakes in proper position, as above stated, should have flat inner surfaces and be of sufficient height to accomplish the object. The hinged sectional construction of the frame is necessary in order that it may be placed around the mass of soap as the caker-frame rises.

The provision of a disk or wheel $54^a$ on the end of each stem 41, Fig. 15, or on the end of each stem 41 and 42 is desirable and important in that it enables the ends of the cutting or severing wires to be formed into approximately circular loops, which encircle the disks or wheels, whereby breakage of the wires is avoided and cutting of the ends of the wires is prevented when they are strained to place them under high tension.

The brackets or castings 59 and 61 may be independently clamped to the frame 38 or to the side arms 28 of the frame 28 29 through the medium of clamps constructed the same as the clamps 34 or 40. While these clamps will serve to securely retain the brackets or castings in proper position, they will not prevent the brackets or castings being shifted toward or from one another on the frame 38 or side arms 28 for the purpose of adjusting the wires to vary their distances apart.

My invention provides a desirable labor-saving machine in the art of cutting or severing soap into bars or cakes and enables this to be conveniently and rapidly effected on a large scale.

In my invention a soap block of greater or less dimensions is blocked up and held stationary in one position during the simultaneous formation of all the slabs and the severing of these superimposed slabs into a large number of cakes of any desired size. This is advantageous and desirable in that the production of soap cakes is simplified and rapidly effected.

My invention avoids intermittently-operating elevators for raising soap blocks step by step, so that they can be cut into slabs or into cakes.

Having thus described my invention, what I claim is—

1. In a soap-caking machine, a cutter consisting of an open frame having longitudinal slots, wires extending into said slots, headed stems having disks or wheels around which the wires are looped at one end, screw-threaded stems to which the wires are connected at the other end, and nuts engaging the screw-threaded stems for straining and placing the wires under tension, substantially as described.

2. In a soap-caking machine, the combination of a horizontally-moving slabber-frame for cutting a soap block into a plurality of slabs, means for holding the soap block stationary while a plurality of slabs are being cut, rack-bars connected with the slabber-frame, gearing for moving the rack-bars in one direction, and means for reversing the motion of the gearing to reverse the motion of the rack-bars, with a vertically-moving caker-frame for cutting the plurality of slabs into cakes, a nut connected with the caker-frame, a rotary screw engaging the nut, means for rotating the screw in either direction, and automatic mechanism for stopping the motion of the screw to automatically stop the caker-frame at the limit of its ascending and descending motions, substantially as and for the purposes described.

3. In a soap-caking machine, the combination with a vertically-moving soap-cutting frame, and mechanism for operating the same, of a horizontally-moving soap-cutting frame, rack-bars connected therewith, gearing for moving the rack-bars in either direction, belts for driving the gearing in either direction, an automatically-operated belt-shifter for automatically shifting the belts and stopping the motion of the horizontally-moving frame as it moves in either direction, and a blocking-frame constructed to bear against the soap and hold it stationary while a plurality of slabs are simultaneously cut by the horizontally-moving soap-cutting frame, substantially as described.

4. In a soap-caking machine, the combination with a horizontally-moving soap-cutting frame, and a soap-carrying car, of means for engaging the cutting-frame with the car, substantially as described.

5. In a soap-caking machine, the combination with a vertically-moving soap-cutting frame, and means for raising and lowering the same, of a horizontally-moving soap-cutting frame, means for moving the same in either direction, a soap-car, and a device movably engaged with the car and serving as an abutment against which the horizontally-moving cutting-frame acts to move the car under the vertically-moving cutting-frame, substantially as described.

6. In a soap-caking machine, the combination with a vertically-moving soap-cutting frame, and means for raising and lowering the same, of a horizontally-moving soap-cutting frame, means for moving the same back and forth, a soap-car, and a transverse beam having a device for detachably engaging one end of the soap-car, whereby the beam serves as an abutment against which the horizontally-moving cutting-frame acts to move the soap-car under the vertically-moving cutting-frame, substantially as described.

7. In a soap-caking machine, the combination with a horizontally-moving slabber-frame for cutting a soap block into a plurality of slabs, and mechanism for moving said slabber-frame back and forth, of a vertically-moving caker-frame, a non-rotary nut connected with said caker-frame, a rotary screw-shaft engaging said nut, belt mechanism for rotating the screw in either direction, and mechanism automatically operated by said caker-frame for stopping it at the limit of its stroke in either direction, substantially as and for the purposes described.

8. In a soap-caking machine, the combination with a horizontally-moving soap-cutting frame, means for moving said frame in either direction, and automatically-operated mechanism for automatically stopping the frame at the limit of its motion in either direction, of a vertically-moving soap-cutting frame having cutting devices mounted thereupon, a vertically-moving frame connected with the vertically-moving soap-cutting frame and provided with a non-rotary nut, a rotary screw engaging said nut, mechanism for rotating the screw in either direction, and mechanism automatically operated by the said vertically-moving frame for stopping the motion of the vertically-moving soap-cutting frame at the limit of its stroke in either direction, substantially as and for the purposes described.

9. In a soap-cutting machine, the combination with a horizontally-moving slabber-frame, and means for operating the same, of a vertically-moving caker-frame, a non-rotary nut connected with the caker-frame, a rotary screw-shaft engaging said nut, belt mechanism for rotating the screw-shaft in either direction, a belt-shifter for shifting the belt of the belt mechanism to reverse the motion of the screw, and a vertical rod connected with the belt-shifter and automatically raised and lowered at the limit of the up-and-down motions of the caker-frame to stop the latter at the limit of its strokes, substantially as and for the purposes described.

10. In a soap-caking machine, the combination with a vertically-moving soap-cutting frame having cutting devices strung thereupon, of a vertically-moving frame connected with said cutting-frame and provided with a non-rotary nut, a rotary screw-shaft engaging said nut, belt mechanism for rotating the screw in either direction, and mechanism automatically operated by the vertically-moving frame for stopping the motion of the cutting-frame at the limit of its stroke in either direction, substantially as described.

11. In a soap-caking machine, the combination with a vertically-moving soap-cutting frame having cutting devices strung thereupon, of a vertically-moving frame connected with said cutting-frame and provided with a non-rotary nut, a rotary shaft engaging said nut, belt mechanism for rotating the screw in either direction, a belt-shifter for shifting the belts to reverse their motion, and devices automatically operating as the cutting-frame rises or falls to automatically actuate the belt-shifter to stop the motion of said cutting-frame at the limit of its strokes, substantially as described.

12. In a soap-caking machine, the combination with a vertically-moving cutting-frame, and a vertically-movable frame connected therewith and provided with a non-rotary nut, of a rotary screw-shaft engaging said nut, belt mechanism for rotating the screw-shaft in either direction, a vertically-movable rod provided with tappets acted upon by the vertically-moving frame, a belt-shifter, and a bell-crank lever connected to the belt-shifter and to said tappet-carrying rod, substantially as described.

13. In a soap-caking machine, the combination with a horizontally-moving frame for dividing a soap block into slabs, a vertically-movable cutting-frame for dividing the slabs into cakes, and means for operating said cutting-frames, of a device constructed to encircle the subdivided soap block and to be moved vertically thereupon as the vertically-moving cutting-frame rises, for the purpose of maintaining the uppermost layer or layers of soap cakes in proper position as the rising cutting-frame leaves the soap, substantially as described.

14. In a soap-caking machine, the combination with a horizontally-moving frame for dividing a soap block into slabs, a vertically-movable cutting-frame for dividing the slabs into cakes, and means for operating said cutting-frames, of a sectional, opening and closing cake-retaining frame, constructed to encircle the subdivided soap block and to be moved vertically thereupon as the vertically-moving cutting-frame rises, for the purpose of maintaining the uppermost layer or layers of soap cakes in proper position as the rising cutting-frame leaves the soap, substantially as described.

15. A sectional cake-retaining frame having sections hinged together and constructed to be applied around the uppermost layers of soap cakes, for retaining them in proper position, substantially as described.

In testimony whereof I have hereunto set my hand in presence of two subscribing witnesses.

CHRISTOPHER LIPPS.

Witnesses:
   HARRY W. RODGERS,
   WILLIS E. MYERS.